(12) United States Patent
Banks

(10) Patent No.: US 6,968,928 B2
(45) Date of Patent: Nov. 29, 2005

(54) DISK BRAKE CALIPER HOUSING HAVING AN OFFSET CAVITY

(75) Inventor: Daniel E. Banks, Climax, MI (US)

(73) Assignee: Dana Corporation, Toledo, OH (US)

( * ) Notice: Subject to any disclaimer, the term of this patent is extended or adjusted under 35 U.S.C. 154(b) by 78 days.

(21) Appl. No.: 10/334,600

(22) Filed: Jan. 2, 2003

(65) Prior Publication Data

US 2004/0154879 A1 Aug. 12, 2004

(51) Int. Cl.[7] .............................................. F16D 65/52
(52) U.S. Cl. ................... 188/72.9; 188/72.7; 188/71.1; 188/72.1; 188/370
(58) Field of Search .............................. 188/72.7, 72.9, 188/156, 157, 161, 188, 159, 162, 71.1, 72.1, 188/370, 369, 368, 367, 366

(56) References Cited

U.S. PATENT DOCUMENTS 5,547,048 A * 8/1996 Anthony .................... 188/72.9
5,927,445 A 7/1999 Bieker et al.
6,367,592 B1 * 4/2002 Kapaan et al. ............. 188/72.1
6,666,308 B1 * 12/2003 De Vries et al. ............ 188/157

FOREIGN PATENT DOCUMENTS

DE 4032886 A1 A1 4/1992

* cited by examiner

Primary Examiner—Matthew C. Graham
(74) Attorney, Agent, or Firm—Rader, Fishman & Grauer PLLC

(57) ABSTRACT

An air disk brake caliper housing is disclosed. The caliper housing includes a open rear end portion that opens into a passageway for receiving an actuator/adjuster mechanism. To minimize the outer contour of the caliper housing to alleviate packaging concerns with respect to a vehicle axle, the passageway is offset above an operating position for the actuator/adjuster mechanism. As the actuator/adjuster mechanism is inserted into the offset passageway, it passes a retaining step formed in the interior of the passageway to provide sufficient running clearance for gears of the actuator/adjuster mechanism. Once passing the retaining step, the actuator/adjuster mechanism may be dropped down to the appropriate operating height and installed in the operating position within the caliper.

10 Claims, 2 Drawing Sheets

DISK BRAKE CALIPER HOUSING HAVING AN OFFSET CAVITY

FIELD OF INVENTION

The present invention relates generally to a disk brake assembly for road vehicles, having a caliper housing, brake disk and an actuator/adjustor mechanism. More specifically, the present invention relates to a smaller sized disk brake caliper housing that is provided with an offset passage or cavity for receiving an actuator/adjuster mechanism during installation.

BACKGROUND OF THE INVENTION

Known brake disk assemblies typically include a caliper housing that has a rearward section for receiving a brake application device that acts upon the brake disk. The brake application devices are equipped with rotary levers that are actuated by an operating cylinder to apply the brake disk.

In one known brake disk assembly, the caliper housing is constructed in one piece such that the section receiving the application unit is largely closed in the rearward portion. The application unit is inserted into the caliper housing section through an opening that faces the brake disk when the caliper is removed from the brake disk. A supporting roller for a rotary lever of the application unit seats on supporting bearings that are constructed on the interior side on the rearward section of the caliper housing. The end of the rotary lever rests against a bridge via two semi-cylindrical steps. A pressure plate closes off the interior section of the caliper housing against which the bridge is spring loaded.

In another known brake disk assembly, the rearward section of the caliper housing also includes a brake application device having a rotary lever that is provided inside the rearward part of a caliper and that has a bridge that carries two adjusting spindles. The end of the rotary lever is supported on the rearward end of the caliper by slide bearing or roller bearing elements. The rearward section of the caliper housing that receives the brake application device is constructed as a separate housing that can be screwed together with the caliper along a separating line.

While known caliper housings have provided a cavity for installing a brake application unit, the rearward sections of the caliper housings have to be sized to sufficiently accommodate the gears. Accordingly, when larger sized gears are used for performance concerns, the size of the caliper housing has to be increased. The increased size of the caliper housing results in packaging concerns proximate to the vehicle axle and chassis components. Therefore, there exists a need for a caliper housing that is capable of sufficiently accommodating larger diameter gears, while minimizing packaging concerns for the vehicle.

SUMMARY OF THE INVENTION

The present invention is directed to a brake caliper housing that alleviates packaging concerns by minimizing the caliper housing profile at the inner and lower area of the caliper in relation to the vehicle axle. Further, the inventive smaller-sized caliper housing also provides sufficient running clearance for gears of a brake adjuster assembly.

In accordance with the invention, a disk brake assembly is provided that includes a brake disk that is operable by an actuator/adjuster mechanism and a caliper housing for retaining the actuator/adjuster mechanism. The actuator/adjuster mechanism includes a rotary lever operatively connected to gears to operate the disk brake. In a preferred embodiment, the actuator/adjuster mechanism is a pre-assembled unit.

In accordance with one aspect of the invention, the caliper housing has an open rearward section that opens into an offset passageway for receiving the actuator/adjuster mechanism. More specifically, the passageway is offset so as to be above the ultimate operating position of the actuator/adjuster mechanism when installed. The passageway terminates in a pilot bore opposite the open rearward section. The passageway further includes a retaining step located in a bottom surface of the passageway.

In accordance with the invention, during installation, the actuator/adjuster mechanism is installed through the open rearward section of the caliper housing, into the offset passageway. Because the passageway is offset, the actuator/adjuster mechanism is installed at a height that is above the operating position of the actuator/adjuster mechanism. Once the gears of the actuator/adjuster mechanism, which generally have a diameter that is greater than the periphery of the remainder of the actuator/adjuster assembly, pass the retaining step, the actuator/adjuster mechanism is dropped down to the operating height. The actuator/adjuster mechanism continues to be inserted into the passageway of the caliper housing until a pilot sleeve position on the distal end of the actuator/assembly mechanism is inserted into the pilot bore in the passageway, thereby placing the actuator/adjuster mechanism in the operating position. The offset passageway and the retaining step of the caliper housing cooperate to provide for more interior room for installation of actuator/adjuster mechanism, while still providing sufficient running clearance for proper operation of the gears of the actuator/adjuster mechanism. Accordingly, a smaller caliper housing profile at the inner and lower rear of the caliper, relative to the vehicle axle is possible, thereby minimizing packaging concerns.

BRIEF DESCRIPTION OF THE PREFERRED EMBODIMENT

The features and inventive aspects of the present invention will become more apparent upon reading the following detailed description, claims, and drawings, of which the following is a brief description:

DETAILED DESCRIPTION OF THE PREFERRED EMBODIMENTS

Figure 1:
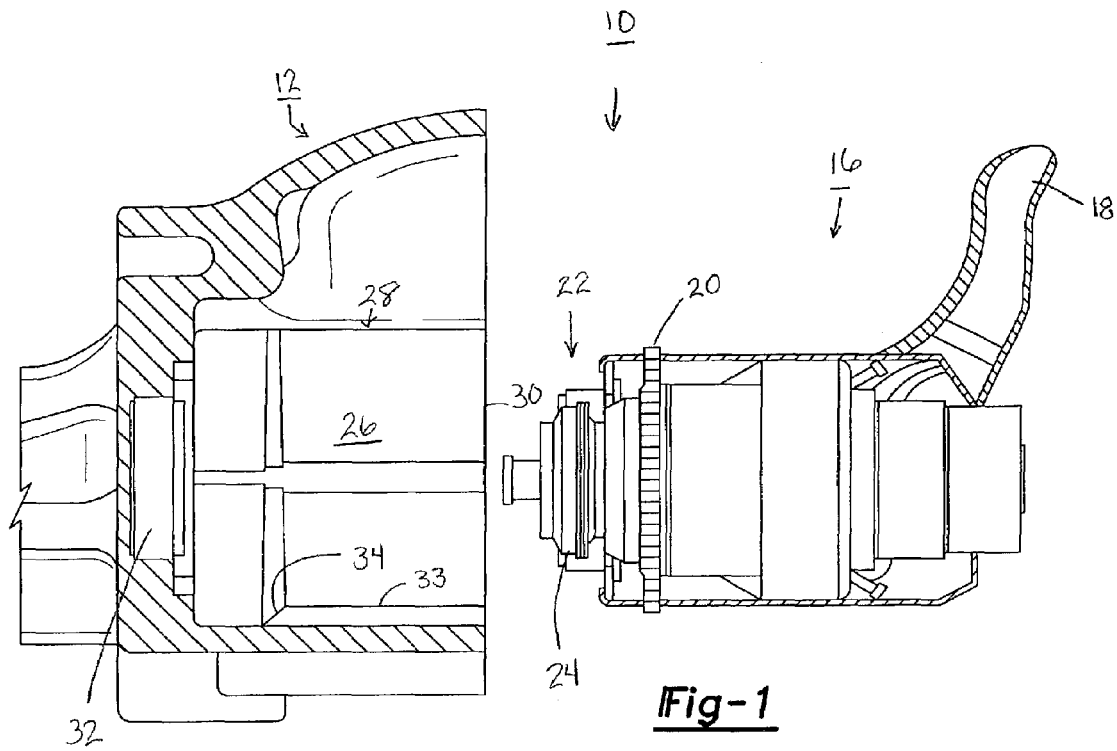
FIG. 1 is a partial cross-sectional view of a caliper housing that receives an actuator assembly in accordance with the present invention.

Referring to FIGS. 1–4, a brake disk assembly 10 constructed in accordance with the present invention is shown. Brake disk assembly 10 includes a conventional brake disk (not shown), a caliper housing 12 and an actuator/adjuster mechanism 16.

In accordance with one aspect of the invention, actuator/adjuster mechanism 16 is rear mounted and includes a rotary lever 18 that projects from the actuator/adjuster mechanism 16. Rotary lever 18 may be actuated by an operating cylinder or other suitable actuating device to operate the actuator/adjuster mechanism 16. Actuator/adjuster mechanism 16 further includes a plurality of gears 20 positioned on an outboard side 22. Gears 20 are operatively connected to rotary lever 18 to transmit force to the brake disk. In one embodiment, gears 20 have a periphery that is greater than the periphery of the remainder of actuator/adjuster mechanism 16, excluding rotary lever 18. A distal end of actuator/adjuster mechanism 16 includes a pilot sleeve 24.

In accordance with one aspect of the invention, caliper housing 12 includes an offset passageway 26 that is sized to be slightly larger than actuator/adjuster mechanism 16. In one preferred embodiment, passageway 26 is offset above an operating position for actuator/adjuster mechanism 16 to allow for a smaller caliper housing 12 profile at the inner and lower area of caliper housing 12 relative to the vehicle axle. More specifically, an upper portion 28 of passageway 26 provides additional clearance for receiving actuator/adjuster mechanism 16 (including gears 20) during installation.

Figure 4:
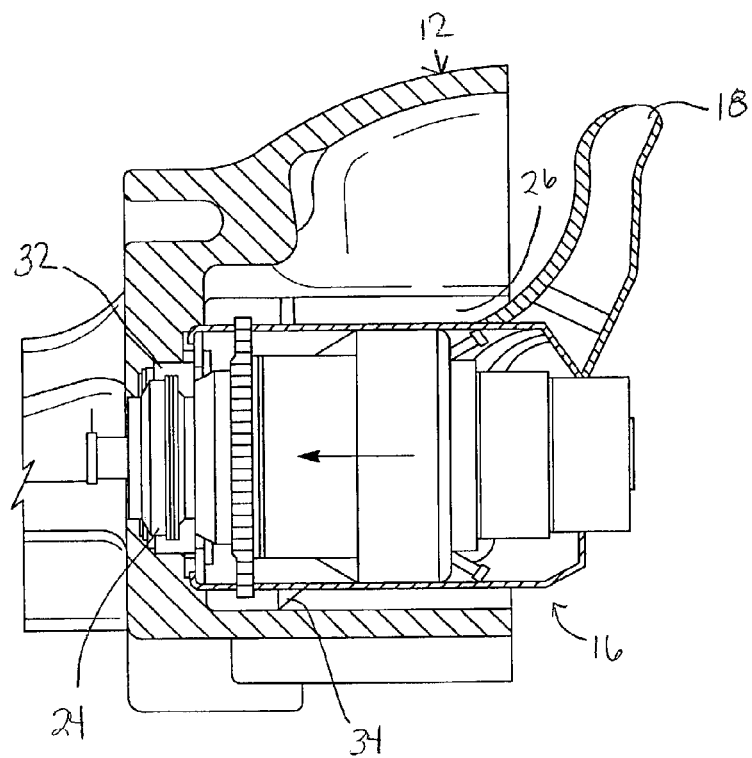
FIG. 4 is a partial cross-sectional view of the caliper housing of FIG. 1, with the actuator assembly installed in the caliper housing.

Passageway 26 is open in the rearward end 30 and narrows toward a pilot bore 32 that is sized to receive pilot sleeve 24 when adjuster/actuator mechanism 16 is installed in caliper housing 12. To properly position adjuster/actuator mechanism 16 in an operating position (as shown in FIG. 4), passageway 26 further includes a retaining step 34 that is positioned along a bottom interior surface 33 of passageway 26. Retaining step 34 slopes downwardly such that the interior profile of the passageway is increased immediately adjacent of retaining step 34. The interior profile of passageway 26 immediately adjacent of retaining step 34 is greater than the periphery of actuator/adjuster mechanism 16 at its greatest extent. For example, as shown in the figures, passageway 26 has an interior profile that is greater than the periphery of gears 20, which have a periphery that is greater than the remainder of actuator/adjuster mechanism. Retaining step 34 serves to provide for a sufficient running clearance for gears 20 when actuator/adjuster assembly 16 is in the installed position.

Figure 2:
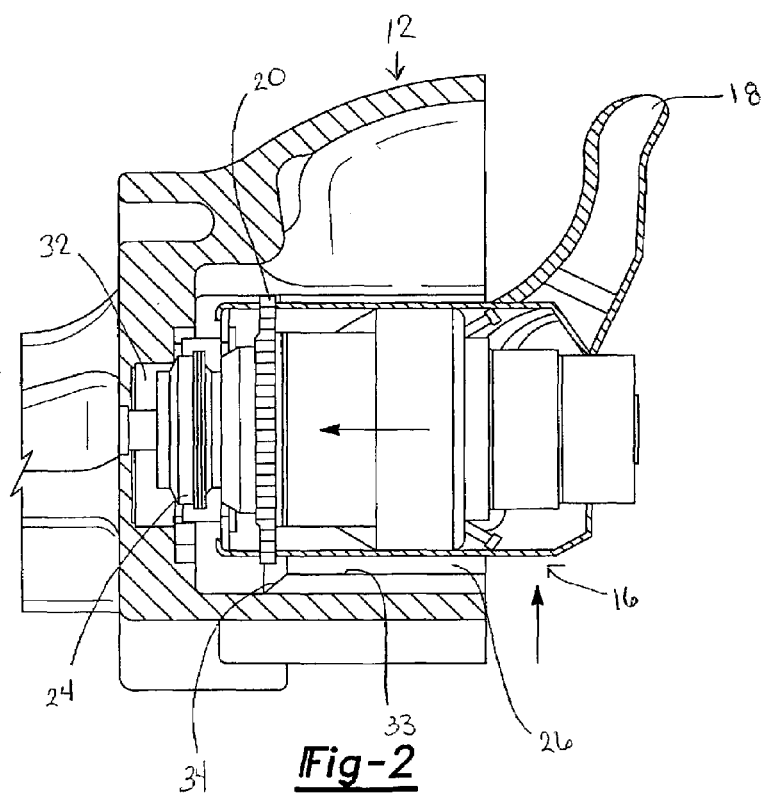
FIG. 2 is a partial cross-sectional view of the caliper housing of FIG. 1, during insertion of the actuator assembly.

Referring to the drawings, the preferred installation of actuator/adjuster mechanism 16 will be explained. Referring first to FIG. 1, actuator/adjuster mechanism 16 is inserted into passageway 26 through open rearward end 30 with pilot sleeve 24 on the outboard side of actuator/adjuster mechanism 16 such that actuator/adjuster mechanism 16 enters passageway 26 before rotary lever 18. As shown in FIG. 2, passageway 26 is offset so as to be above the ultimate operating position for actuator/adjuster mechanism 16. The offset advantageously allows for a smaller caliper housing 16 profile at the inner and lower area of the caliper in relation to the vehicle axle (not shown), but still provides sufficient clearance in the interior of caliper housing 16 to permit actuator/adjuster mechanism 16 (including gears 20) to be inserted into an operating position.

Figure 3:
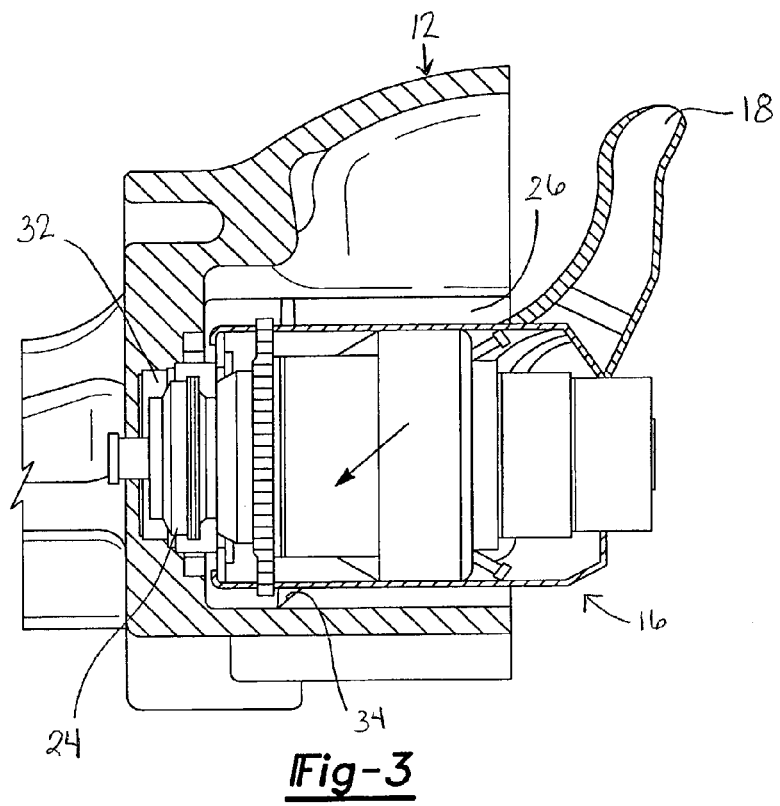
FIG. 3 is a partial cross-sectional view of the caliper housing of FIG. 1, during another stage of insertion of the actuator assembly.

Actuator/adjuster mechanism 16 is propelled through passageway 26 above the installed height of the operation position until gears 20 pass retaining step 34. Referring to FIG. 3, once gears 20 pass retaining step 34, actuator/adjuster mechanism 16 is dropped down to the installed height of the operating position. As shown in FIG. 4, once actuator/adjuster assembly 16 is dropped down, it continues to be inserted into caliper housing 12 until pilot sleeve 24 reaches a bottom surface 36 of pilot bore 32 to position actuator/adjuster assembly 16 into the operating position. As can be seen, retaining step 34 is sized to provide sufficient running clearance for gears 20 when actuator/adjuster mechanism 16 is in the operation position.

It is to be understood that the above description is intended to be illustrative and not limiting. Many embodiments will be apparent to those of skill in the art upon reading the above description. Therefore, the scope of the invention should be determined, not with reference to the above description, but instead with reference to the appended claims, along with the full scope of equivalents to which such claims are entitled.

What is claimed is:

1. A disk brake assembly having a caliper housing and a brake disk, comprising:
    a caliper housing having a rearward opening;
    wherein said caliper housing includes an offset passageway formed in the interior of said caliper housing, said offset passageway having a predetermined sized interior profile to receive an actuator mechanism having a plurality of gears and a rotary lever, said offset passageway farther including a retaining step formed therein; and
    wherein said actuator mechanism is receivable in said offset passageway of said caliper housing during installation and is positionable in an operating position after a portion of said actuator mechanism is inserted above said retaining step.

2. The disk brake assembly of claim 1, wherein said offset passageway is offset at a height above said operating position of said actuator mechanism such that said actuator mechanism must be inserted into said offset passageway above an operating position of said actuator mechanism.

3. The disk brake assembly of claim 1, wherein said retaining step slopes downwardly such that said interior profile of said passageway immediately adjacent to said retaining step is greater than the height of the outer periphery of said gears of said actuator mechanism so as to provide sufficient running clearance for operation of said gears when said actuator mechanism is in the operating position.

4. The disk brake assembly of claim 1, wherein said actuator mechanism is a pre-assembled unit.

5. The disk brake assembly of claim 1, wherein said offset passageway narrows into a pilot bore adjacent to said retaining step.

6. The disk brake assembly of claim 5, wherein said actuator mechanism includes a pilot sleeve tat is positionable within said pilot bore when said actuator mechanism is placed in the operating position within said caliper housing.

7. A disk brake assembly having a caliper housing and a brake disk, comprising:
    a caliper housing having a rearward opening that opens into an offset passageway formed in the interior of said caliper housing, said offset passageway having a predetermined sized interior profile to receive an actuator mechanism having a plurality of gears and a rotary lever and further including a retaining step, the interior profile of said passageway immediately adjacent to said retaining step being greater than the outer periphery of said actuator mechanism at its greatest extent;
    wherein said actuator mechanism is receivable in said offset passageway of said caliper housing above said retaining step during installation; and
    wherein said offset passageway is offset above an operating position of said actuator mechanism such that said actuator mechanism is insertable into said offset passageway above said operating position until said outer periphery of said actuator mechanism at its greatest extent passes said retaining step, whereby said actuating mechanism is lowerable to said operating height.

8. The disk brake assembly of claim 7, wherein said actuator mechanism is a pre-assembled unit.

9. The disk brake assembly of claim 8, wherein said offset passageway narrows into a pilot bore adjacent to said retaining step.

10. The disk brake assembly of claim 9, wherein said actuator mechanism includes a pilot sleeve that has a predetermined size so as to be positionable within said pilot bore when said actuator mechanism is placed in the operating position within said caliper housing.

* * * * *